May 25, 1943.  E. H. AYERS  2,320,117
ELECTRIC CONTROL MEANS
Filed July 16, 1942
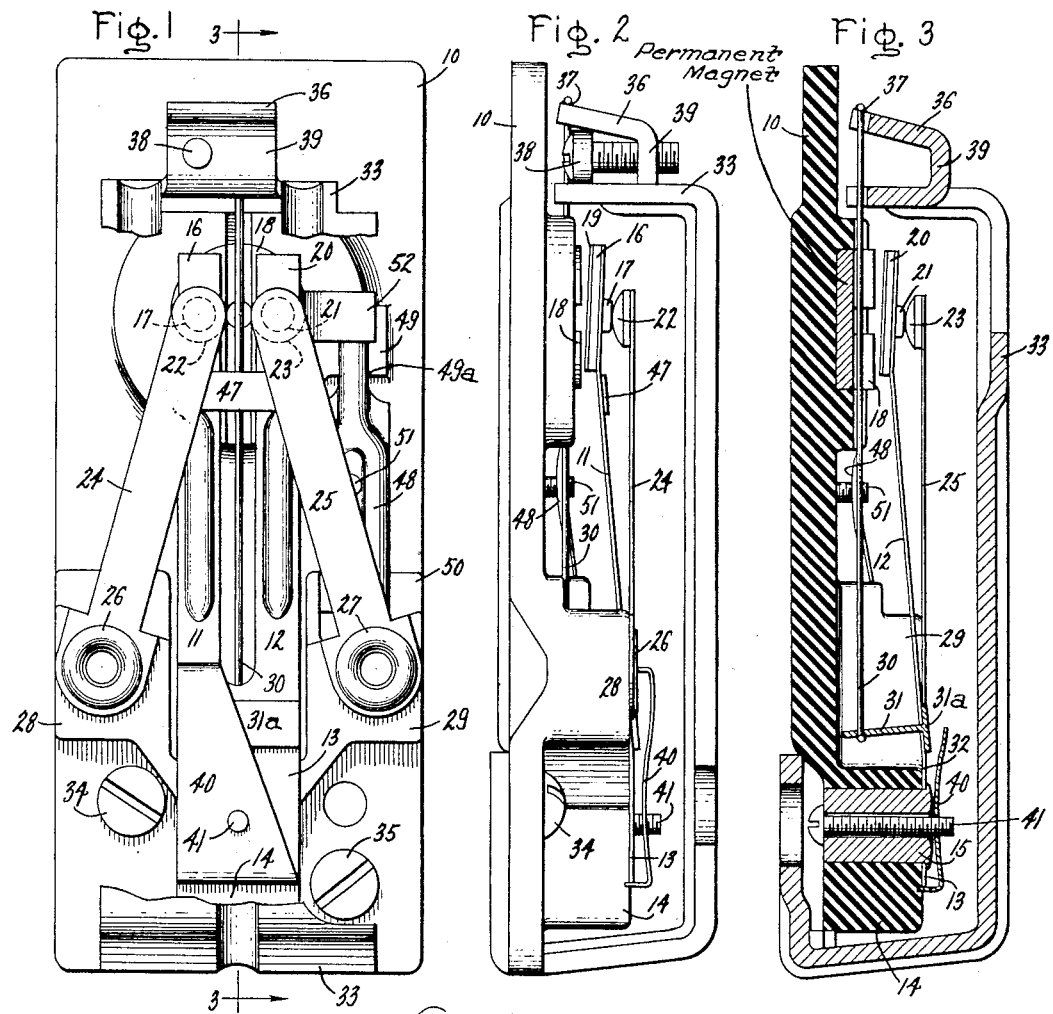
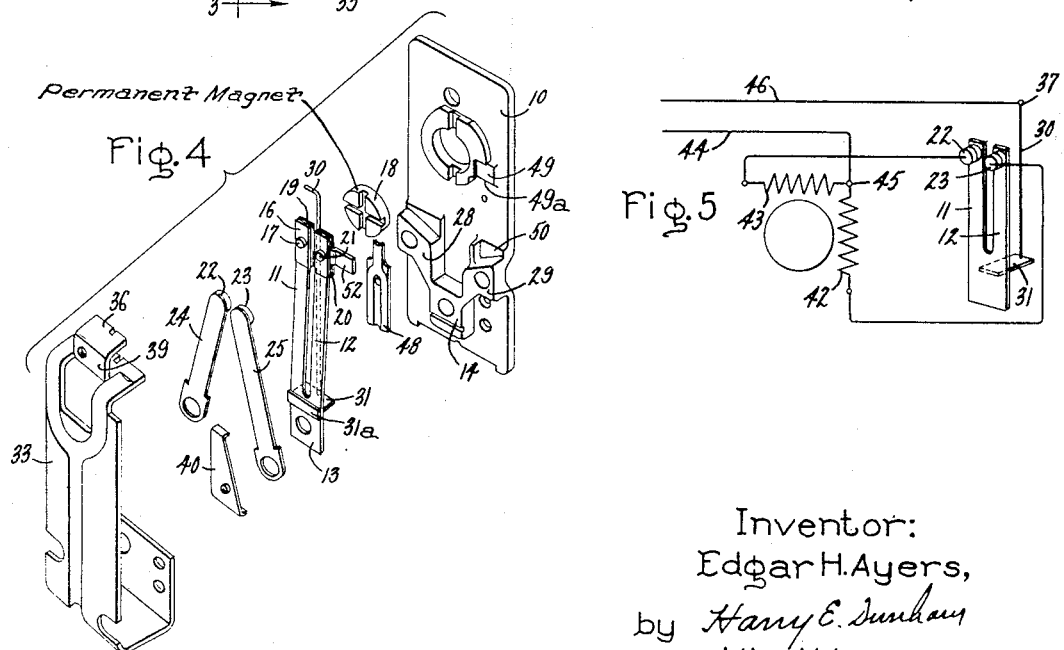
Inventor:
Edgar H. Ayers,
by Harry E. Dunham
His Attorney.

Patented May 25, 1943

2,320,117

UNITED STATES PATENT OFFICE 2,320,117

ELECTRIC CONTROL MEANS

Edgar H. Ayers, Schenectady, N. Y., assignor to General Electric Company, a corporation of New York Application July 16, 1942, Serial No. 451,202

1 Claim. (Cl. 200—113)

My invention relates to electric control means, more particularly to systems and apparatus for controlling the starting and running circuits of an electric motor thereby to start the motor and protect the motor from overload, and has for its object a simple, reliable and inexpensive device of this character.

In carrying out my invention in one form, I provide two pairs of circuit making and breaking contacts, together with a single hot wire thermostatic operating device for moving the movable contact of each pair between closed and open circuit positions. The movable contacts are mounted on the ends of spring arms which bias the movable contacts to their open circuit positions, but the spring arms are held by the hot wire when the hot wire is cold in their closed circuit positions against the bias of the spring arms. I also provide permanent magnets for giving a snap action to each movable contact.

My invention is especially useful in the starting and overload protection of split phase alternating current motors such as used in the driving of domestic refrigerators. As applied to a motor of this type, the hot wire thermostat is connected in circuit with both the starting and running windings of the motor so as to carry the total motor current, while one pair of contacts is connected in circuit with the starting winding of the motor and the other pair is connected in circuit with the running winding of the motor. Thus, in the operation of the device, when the motor is started the total motor current flows through the hot wire thermostat which heats quickly and thereby elongates so as to open the starting circuit contacts after a predetermined desired starting interval, such as one-fourth of a second. Thereafter, in the event of a continued overload greater than a maximum permissible value, the hot wire is heated to open the other pair of contacts and thereby deenergize the motor.

For a more complete understanding of my invention, reference should be had to the accompanying drawing in which Fig. 1 is a plan view with a supporting part omitted of motor control apparatus embodying my invention; Fig. 2 is a side elevation view of the device shown in Fig. 1; Fig. 3 is a sectional view along the line 3—3 of Fig. 1 looking in the direction of the arrows; Fig. 4 is an exploded view of the device showing the parts reduced in size in perspective; while Fig. 5 is a diagrammatic view showing a device embodying my invention applied to the control of a split phase motor.

Referring to the drawing, I have shown my invention in one form as suitable for the starting and overload protection of small split phase motors. It comprises a support or base 10 made of electrically insulating material such as a molded compound. Mounted on this base are two resilient contact arms 11 and 12 extending in substantially parallel relation with each other and in spaced relation with the base. Preferably, as shown, these two contact arms are stamped from a single piece of spring sheet material, such as phosphor bronze material, so that they are joined together integrally at their lower ends, as seen in the drawing, by a sheet portion 13. This portion 13 is secured to the lower end of the base, more particularly to a raised portion 14 on the lower end of the base, by means of a brass rivet 15.

On its free or upper end the arm 11 carries an armature 16 on its side adjacent the base 10, while on its opposite side it carries a movable electric switch contact 17. The armature 16 is made of a magnetic material, preferably soft iron, and it is in position to be attracted by a permanent magnet 18 secured to the base. Preferably, the face of the armature 16 adjacent the face of the magnet 18 is provided with a relatively thin layer 19 of non-magnetic material, such as brass, so as to assure a small air gap when the armature is in its attracted position. This air gap prevents sticking of the armature on the magnet and assures a predetermined uniform magnetic pull on the armature when in its attracted position. A similar armature 20 provided with a face of non-magnetic material is mounted on the other contact arm 12, together with a second movable switch contact 21 on the opposite side of the contact arm.

The movable contacts 17 and 21 cooperate respectively with stationary switch contacts 22 and 23 which are carried on the ends of spring supporting arms 24 and 25 made of electrically conducting material such as phosphor bronze. As shown in the drawing, the arms 24 and 25 converge toward each other in the direction of the ends carrying the contacts 22 and 23. The other or lower ends, as seen in the drawing, are secured by copper or brass rivets 26 and 27 to raised portions 28 and 29 on the base. These raised portions are of substantially the same height as the central raised portion 14.

For the operation of the contact arms 11 and 12, a hot wire thermostat 30 is provided. One end of this wire, the lower end as seen in the drawing, is connected rigidly to a transversely extending operating member 31 secured to the plate 13 at a point near the raised portion 14. Thus, the force applied by the wire 30 to the laterally extending member 31 applies in turn a bending stress to the portion 32 of the plate 13 between the member 31 and the raised portion 14 whereby the contact arms 11 and 12 are moved between closed and open circuit positions.

As shown, the member 31 is a T section bar having its base 31a secured to the plate 31 at a point adjacent the junction of arms 11 and 12 with the plate and spaced from the raised portion 14 of the bar so as to leave a bendable portion 32 as previously noted. The upright portion of the member 31 extends through an aperture provided for it in the plate 13, and it is to the end of this upright portion of the T that the hot wire 30 is secured. This upright portion and the base portion 31a extend transversely with respect to the arms 11 and 12, and as shown, substantially across the arms. The base 31a is secured integrally as by brazing or welding to the plate 13 on the side opposite the hot wire 30.

For purposes of ambient temperature compensation, the other or upper end of the hot wire 30 is secured to the end of a metal support 33 extending substantially parallel with the hot wire 30 and having its lower end bent around the lower end of the base and secured to the left-hand side of the base, as seen in Figs. 1, 2 and 3, by suitable screws 34 and 35. This member 33 is made of material having approximately the same temperature coefficient of expansion as the hot wire 30 so as to compensate the device for changes in ambient temperature.

For purposes of adjustment, a tab 36 is bent upward and to the left hand on the member 33 and it is to the end of this tab that the upper end of the wire 30 is secured by a brazed or welded joint 37. Adjustment is effected by means of a screw 38 extending through a threaded aperture in the base portion 39 of the tab. It will be seen that the head of the screw is wedged between the end of the tab and the end of the member 33 and by turning the screw so as to move the head toward the right, as seen in Fig. 2, the tab is pushed outward thereby to increase the tension on the hot wire. By thus adjusting the screw, the temperature of the hot wire at which it opens the switches can be adjusted as desired. This is primarily a high temperature adjustment.

An adjusting spring member 40 is provided for the contact arm 11. This spring has its two ends bent laterally, one end, the upper one as seen in the drawing, engaging the arm 11 at a point above the laterally extending connecting member 31. The opposite end of the member 40 bears on the projection 14 of the base. By means of a screw 41 extending through the rivet 15, the middle portion of the member 40 can be depressed as desired thereby to vary the pressure applied to the arm 11 and vary the temperature and current value at which the arm 11 is operated by the hot wire.

As shown in Fig. 5, the device is connected in the circuit of a split phase motor with the contact arm 12 in circuit with the starting winding 42 of the motor and the contact arm 11 in circuit with the running winding 43 of the motor. One supply main 44 runs directly to a common point 45 between the two windings while the other supply main 46 is connected to the end of the hot wire 30. This connection is conveniently made by connecting the main 46 directly to the lower end of the member 33 on the left-hand side of the base, as seen in Figs. 2 and 3. Thus, this circuit passes through the member 33 to the upper end of the hot wire and thence through the hot wire and the transverse operating member 31 to the two contact arms 11 and 12 and their movable contacts.

Electric connections are made between the ends of the motor winding opposite the point 45 and the stationary contacts 22 and 23 by connecting the ends of the windings directly to the rivets 26 and 27 which secure the spring arms 24 and 25 to the base. These connections preferably are made by providing tapped holes in the rivets to receive clamping screws (not shown) which are inserted from the left-hand side of the base, as seen in Figs. 2 and 3. Electric connections from the windings are mechanically and electrically secured by the screws to the rivets 26 and 27.

When the hot wire is at the ambient temperature of the motor surroundings, the two contacts of each pair will be in engagement with each other by reason of the fact that the wire 30, which has a positive temperature coefficient of expansion, has shortened because of its low temperature and applied a clockwise bending stress, as seen in Fig. 3, to the plate 13 whereby the armatures are pulled away from the permanent magnet and the movable contacts moved into engagement with their stationary contacts. With the device connected in the circuits of the motor, as shown in Fig. 5, when the motor circuit is closed as by a manual switch (not shown) or a refrigerator temperature responsive switch (not shown), the total motor current flows through the hot wire 30. This heavy current heats the hot wire rapidly and in a short time, such as one-fourth of a second, elongates the hot wire sufficiently to permit the magnet to pull the armature 20 to its attracted position and thereby separate the contacts 21 and 23 and open the circuit of the starting winding. The motor current then is at a lower value, the motor having accelerated to its full speed, and this running current of the motor does not heat the wire 30 sufficiently to cause movement of the contact arm 11 to its open circuit position, although it does heat the wire enough to maintain the contacts 21 and 23 separated. The motor therefore continues to run under full load conditions with the contacts 17 and 22 in engagement with each other. However, in the event of a predetermined overload on the motor wire higher than a predetermined maximum permissible overload, the wire 30 is heated enough and, therefore, elongates sufficiently to allow the magnet to pull the armature 16 to its attracted position. This separates the contacts 17 and 22 and thereby opens the motor circuit.

When the motor circuit is thus opened, the hot wire begins to cool and when it has cooled to a predetermined low temperature, it pulls the armatures away from the magnet and recloses both pairs of contacts for restarting of the motor.

In order to assure that the contacts 21 and 23 in the starting winding circuit are reclosed at least as soon as the other contacts, a mechanical interlock is preferably provided between the contact arms 11 and 12. This interlock consists simply of a metallic bar 47 secured to the arm 11 on its right-hand side, as seen in Fig. 2, and extending toward the right, as seen in Fig. 1, behind the contact arm 12. Thus, whenever the arm 12 moves to its closed circuit position if the arm 11 is not already in its closed circuit position the arm 12 engages the cross bar 47 and thereby forces the arm 11 to its closed circuit position. This assures that the running winding will always be energized when the starting winding is energized.

An adjustment is also provided to provide, if required, an air gap between the face of the armature 20 and the magnet whereby the device can be adjusted for low temperature operation to reclose the pairs of contacts when the hot wire has cooled to a predetermined low temperature. This adjusting means comprises a spring member 48 having its ends bearing on projections 49 and 50 on the base. By means of a screw 51 extending through the base, the center of the spring member 48 can be pulled toward the base as desired whereby the upper end of the member pivots on the lower edge 49a of the projection 49. The upper end of the member 48 is behind, as seen in Fig. 1, a lateral projection 52 secured to the armature 20. Thus, as the middle of the member 48 is pulled toward the base, its extreme upper end moves away from the base and pushes the projection 52 away from the base whereby the armature 20 is held in spaced relation with the magnet.

For purposes of simplification, I have shown a single permanent magnet 18 having two pairs of poles, one pair for each of the two armatures. If desired, of course, a separate permanent magnet can be provided for each armature. This magnet is preferably made of an alloy having a high coercive force consisting essentially of aluminum, nickel, copper and iron such as described and claimed in U. S. Patent No. 1,947,274, issued on February 13, 1934, to William E. Ruder and Patent No. 2,027,994, issued on January 14, 1936, to Tokushichi Mishima.

As previously noted, the support 33 for purposes of ambient temperature compensation has about the same temperature coefficient of expansion as the hot wire 30. This support 33 may be made of steel while the hot wire is preferably made of an alloy consisting of nickel 80% and chromium 20%.

Preferably, various mechanical and electrical connections in the device are made by electric spot welding as, for example, the connections between the ends of the wire 30 and the tab 36 and member 31.

While I have shown a particular embodiment of my invention, it will be understood, of course, that I do not wish to be limited thereto since many modifications may be made, and I therefore contemplate by the appended claim to cover any such modifications as fall within the true spirit and scope of my invention.

What I claim as new and desire to secure by Letters Patent of the United States is:

A control device comprising a base made of electrically insulating material, a pair of spring arms extending in parallel relation having adjacent ends secured to said base and their other free ends movable upon flexure of said arms, an armature carried on the free end of each of said arms, a movable contact on the free end of each of said arms, a pair of spring mounted stationary contacts on said base in position to be engaged respectively by said movable contacts, a hot wire thermostat extending lengthwise of said arms, an operating member secured to said arms adjacent said base extending laterally with respect to said arms, a connection between said wire and said operating member, a rigid metallic supporting member extending lengthwise of said arms having one end secured to said base, an adjustable connection between the other end of said supporting member and said wire so that said wire biases said arms normally to positions in which said contacts of said pairs are in engagement with each other, magnet means cooperating with said armatures to effect quick separations of said contacts of said pairs when said wire is heated, and a mechanical interlock between said arms for preventing a predetermined sequence of operation of said movable contacts between their closed and open positions.

EDGAR H. AYERS.